United States Patent [19]

Sukup et al.

[11] Patent Number: 5,255,469
[45] Date of Patent: * Oct. 26, 1993

[54] IMPLEMENT FOR THE REMOVAL OF INSECTS OR THE LIKE FROM PLANTS

[75] Inventors: Eugene G. Sukup, Hampton; Charles E. Sukup; Steven E. Sukup, both of Dougherty, all of Iowa

[73] Assignee: Sukup Manufacturing Company, Sheffield, Iowa

[*] Notice: The portion of the term of this patent subsequent to Jun. 1, 2010 has been disclaimed.

[21] Appl. No.: 513,960

[22] Filed: Apr. 25, 1990

[51] Int. Cl.⁵ .............................. A01M 5/08
[52] U.S. Cl. ...................................... 43/140
[58] Field of Search .................. 43/138, 139, 140, 141

[56] References Cited

U.S. PATENT DOCUMENTS

| | | | |
|---|---|---|---|
| 886,535 | 5/1908 | McCurdy | 43/140 |
| 1,012,437 | 12/1911 | Rea et al. | 43/141 |
| 1,189,720 | 7/1916 | Morrow . | |
| 1,250,516 | 12/1917 | Salter . | |
| 1,457,420 | 6/1923 | Bender | 43/140 |
| 1,586,123 | 5/1926 | Sikorski | 43/140 |
| 2,111,030 | 3/1938 | Mote | 43/141 |
| 2,201,463 | 5/1940 | Williams et al. | 43/140 |
| 2,346,270 | 4/1944 | Nisbet . | |
| 2,374,150 | 4/1945 | Williams . | |
| 2,389,677 | 11/1945 | McCay . | |
| 2,608,023 | 8/1952 | Dillon | 43/140 |
| 2,643,482 | 6/1953 | Wilson | 43/140 |
| 2,722,082 | 11/1955 | Nisbet | 43/141 |
| 4,825,582 | 5/1989 | Szynal | 43/140 |

OTHER PUBLICATIONS

"Washington Times" Bug Sucker Article, 24 Aug. 1988, p. E8.
Paper by T. Unterzuber entitled "A Pneumatic System for the Removal of Insects from Leafy Greens".
Photograph A and article depicting the "Vac-Us" Machine Article Entitled Beguiling Bag Vacs from California Farmer Sep. 1, 1990.
Photographs B. and C of a Subsequent "Vac-Us" Machine.

*Primary Examiner*—Mark Rosenbaum
*Assistant Examiner*—James Miner
*Attorney, Agent, or Firm*—Leydig, Voit & Mayer, Ltd.

[57] ABSTRACT

Implements for the removal of insects from plants are provided which dedicate an individual axial flow centrifugal fan unit to each crop row unit. The fan unit also destroys the insects so removed. The frame of the implement can be articulated and driven in such a manner so as to permit fan unit position adjustment while the fans are driven and running. In some embodiments, each fan unit is constructed with means which directs at least a portion of the exhaust of the fan to the plant row in order to further facilitate insect dislodgement and removal into the intake of the fan.

41 Claims, 9 Drawing Sheets

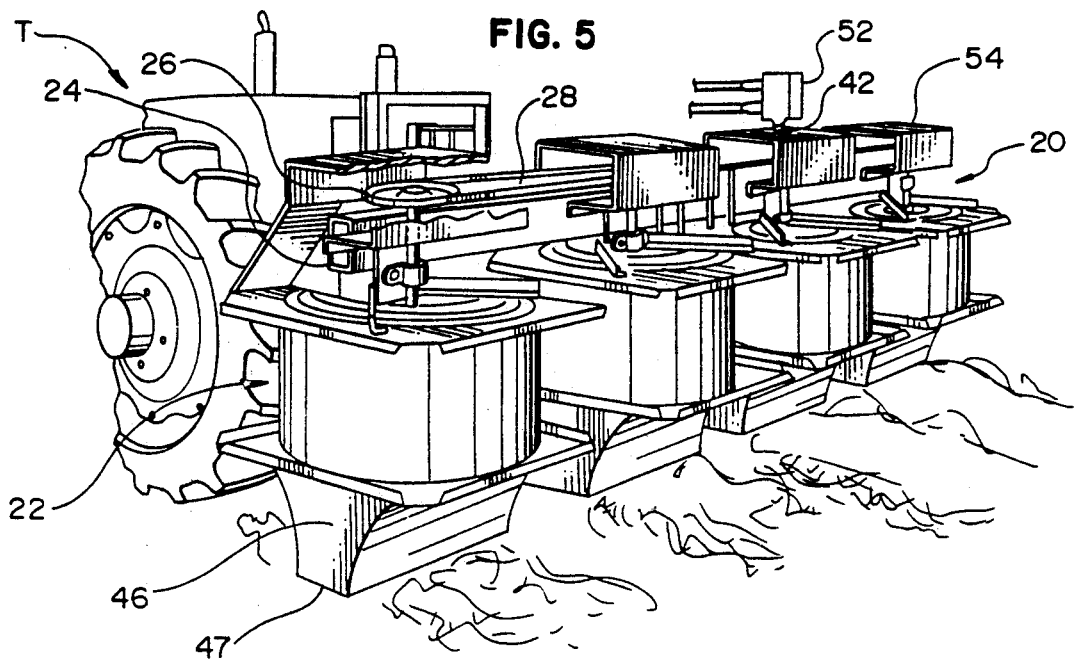
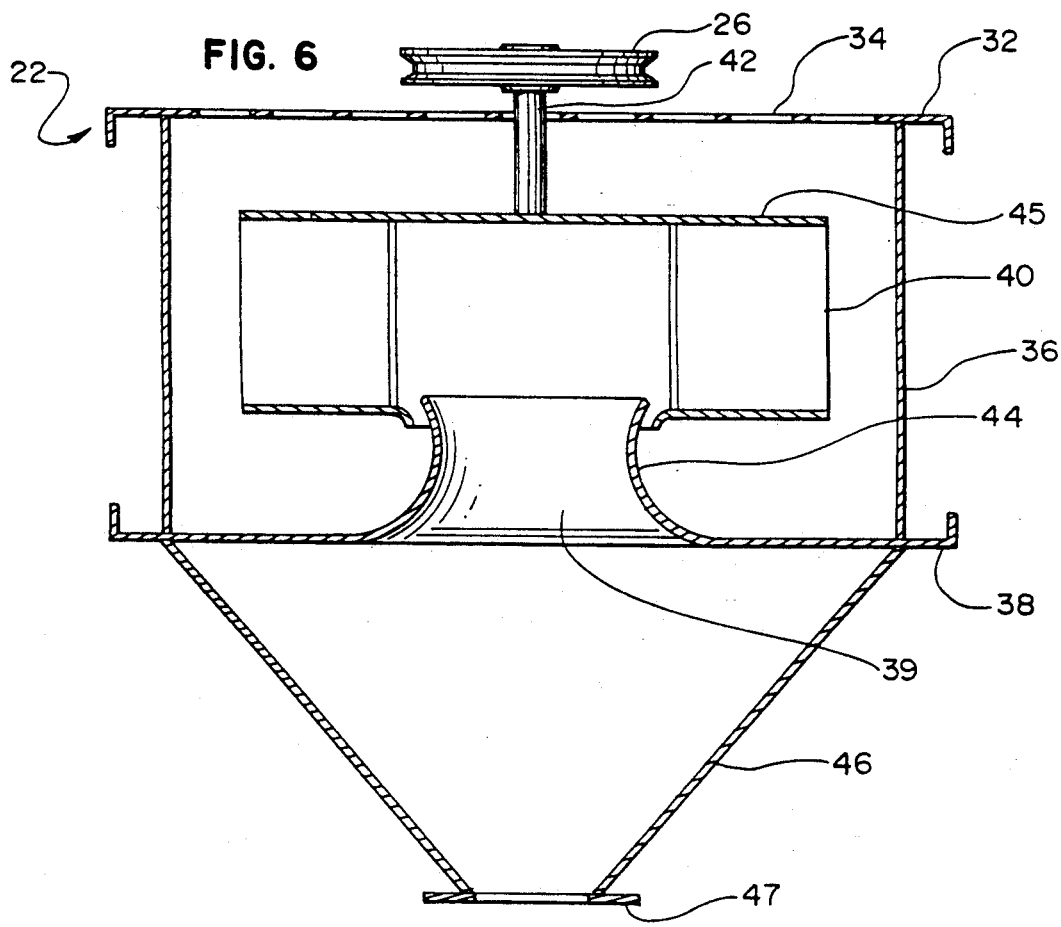

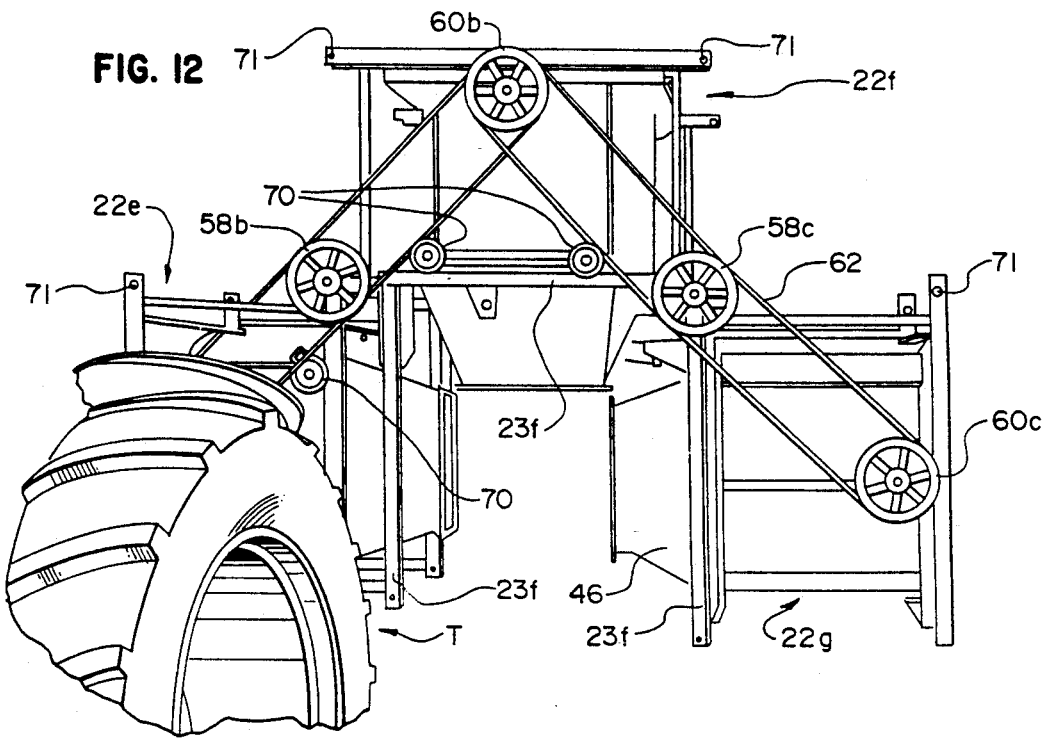
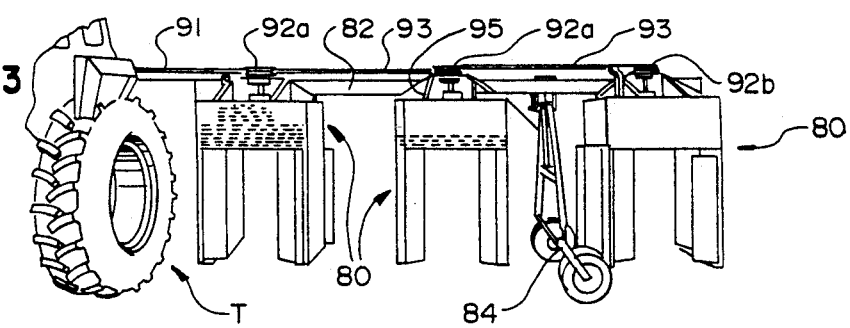
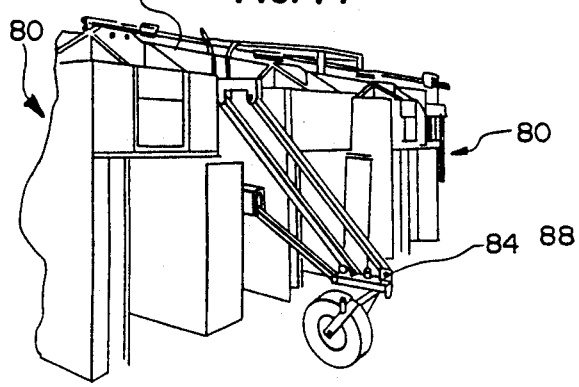
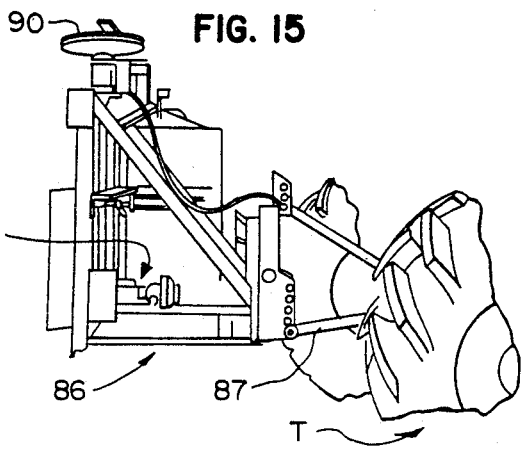

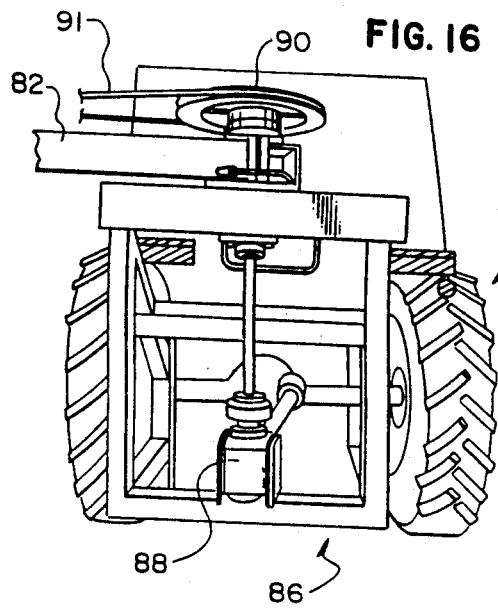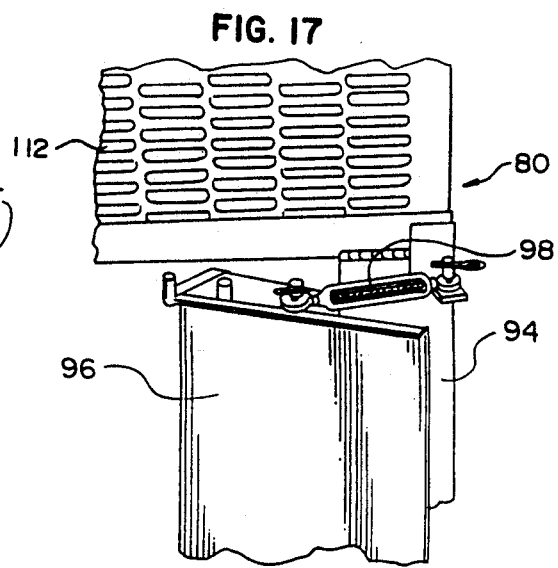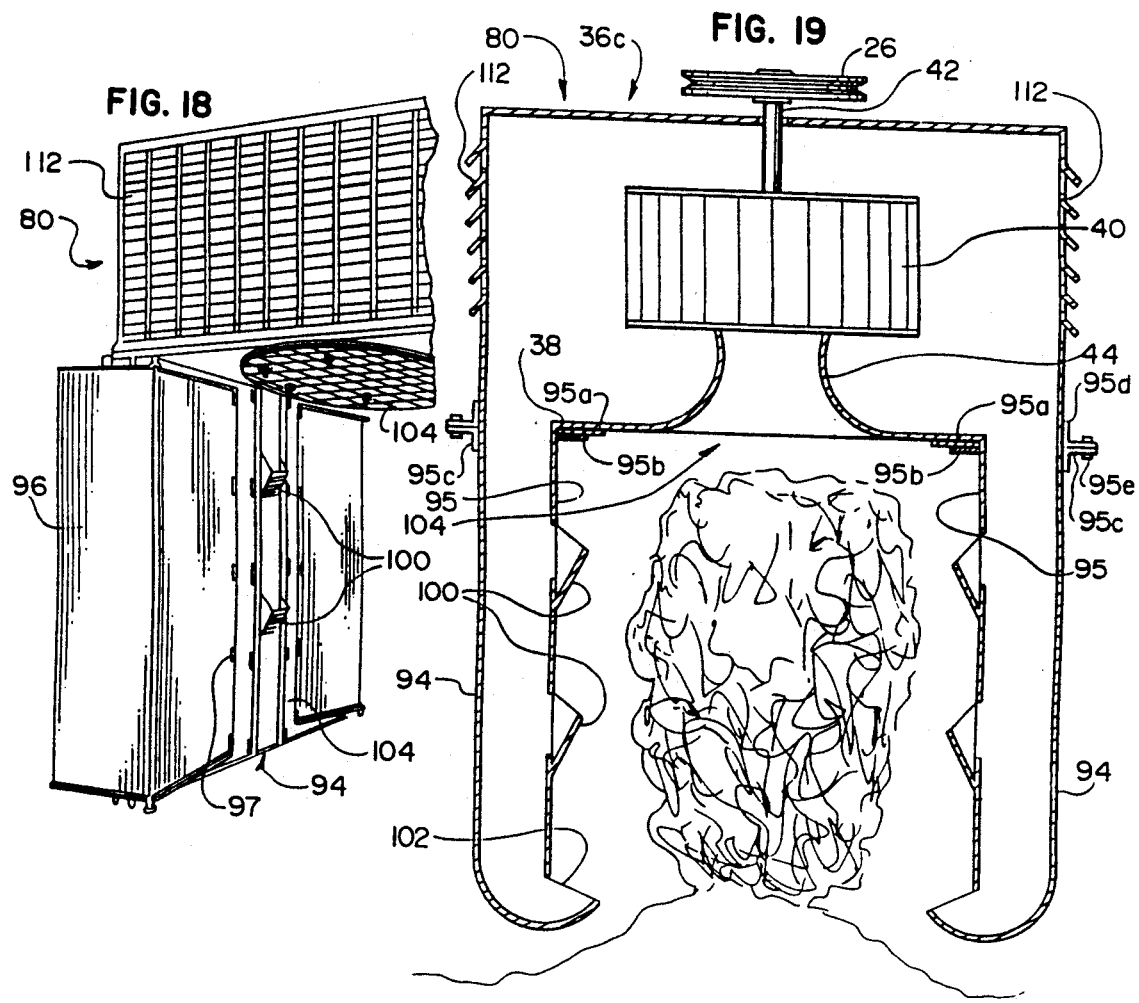

IMPLEMENT FOR THE REMOVAL OF INSECTS OR THE LIKE FROM PLANTS

BACKGROUND OF THE INVENTION

The present invention relates to implements for the removal of insects or the like (i.e., insects and other small pests against which pesticides are used on plant foliage) from live plants on a commercial scale through the use of suction and forced air streams.

Presently, there is a heightened interest in non-chemically dependent methods of insect control and eradication. Such interest is in part caused by public concerns regarding the environmental dangers and risks presented by chemical pesticides. In addition, chemical pesticides are increasingly being rendered ineffective due to the evolution of pesticide-resistant strains of insects. Finally, pesticides are a substantial and burdensome recurrent cost for the farmer.

Various attempts at manufacturing effective and commercially practicable suction machines for removing insects from plants in the field have been undertaken in the past. Most of these early attempts are comparatively inefficient due to an inability to remove insects from a multiplicity of plant rows simultaneously. In addition, the machines which could treat more than one plant row simultaneously rely in large part on elaborate manifolds or duct work to focus the suction action on the plant row. Such arrangements decrease the efficiency of the suction action because of the inherent resistance to air flow imparted by the manifolds and duct work. Finally, these earlier devices are not readily adaptable in regard to the type and size of plants which can be treated.

The invention herein disclosed represents significant improvements over the prior art. The invention contains a dedicated fan unit for each plant row unit to remove insects from the plants of the respective row. This invention has the added feature of destroying the insects so removed. In the preferred embodiment these fans are axial flow centrifugal fans. Such fans are reliable and uncomplicated and also facilitate insect destruction. In addition, the support frame of the implement can be articulated and driven so as to permit relative positioning movement of fan units while the fans are driven and running; thus facilitating the continuous use of the implement in different applications, including folding of the support frame. This feature also enhances the ease of navigation, transportation and storage. Furthermore, an encompassing fan housing may be used which redirects a portion of the exhaust of the fan in the form of a continuous air blast to the plant foilage; thereby dislodging insects and contributing to their collection through the intake. This air blast maximizes insect removal by assisting the suction and collection action of the fan unit.

SUMMARY OF THE INVENTION

It is therefore an object of the present invention to provide an improved means for removing and destroying insects from plants.

Another object is to provide an implement which is adapted for use with conventional farm equipment such as tractors. This implement receives its power from the tractor engine via belt drives, drive shafts, hydraulic motors, or the like. It is further contemplated that the implement could be powered by an independent power source such as a dedicated internal combustion engine.

Another object is to provide a vacuuming-type of machine with a simple fan arrangement which efficiently collects insects from the foliage of plants and destroys those insects.

Another object is to provide an implement which eliminates extensive duct work and maximizes removal power.

A further object is to provide an articulated frame and related drive means which allows fan unit position adjustment to be undertaken while the fans are kept running via a mechanical drive interconnection; thereby facilitating continuous operation during turn-around as well as convenient transportation and storage and permitting custom adaptation of the implement for particular applications.

It is still another object to provide an encompassing fan assembly with an integrated channeling means; whereby exhaust of the fan is directed to the lower portions of the plant; thereby dislodging insects to enhance removal into the intake.

In summary, there is described and depicted an implement which dedicates at least one axial flow centrifugal fan per plant row unit, each such fan unit having a direct axial intake immediately adjacent the plant positions. A plurality of fan units can be mounted on one frame so as to permit insect removal from a multiplicity of rows simultaneously.

The mounting frame can be articulated, a feature which promotes at least two attributes. First, by articulating the frame, transportation and storage are facilitated by effectively decreasing the lateral dimension of the implement. Second, the accompanying drive means is coaxial with and symmetrical about the articulation axis, which allows for custom adaptation of fan unit position to be undertaken while the fans are driven and running, such as during turns between successive traverses of a field and to adjust to various crop sizes and conditions.

In addition, the fan units can be constructed in an encompassing arrangement. This arrangement includes a channeling means to direct exhaust of the fan back to the plant, which facilitates the dislodgment of insects from the plant. This construction still permits a direct intake of air into the fan; thus, suction power is maximized because the absence of extensive intake duct work minimizes resistance.

All fan units are similar in that the intake air stream passes through the axial flow centrifugal fan; whereby any insects present in the air stream are destroyed by the fan. Thus, the various embodiments described herein remove insects from crops and destroy the insects so removed.

BRIEF DESCRIPTION OF THE DRAWINGS

For the purpose of facilitating an understanding of the invention, reference is made to the accompanying drawings wherein:

FIG. 5 is another perspective view of such a four row implement in a working environment;

FIG. 6 is a cross-sectional view of another fan unity;

FIG. 12 is a front perspective view of the multiply articulated embodiment illustrating the articulated drive system;

FIG. 13 is a front perspective view of another implement which includes encompassing fan units employing teachings of the invention;

FIG. 14 is rear perspective view of the implement of FIG. 13;

FIG. 15 is a side perspective view of the mounting section of the frame of the implement of FIG. 13;

FIG. 16 is a rear perspective view of the mounting frame of FIG. 15;;

FIG. 17 is an enlarged fragmentary perspective view of an upper portion of an encompassing fan unit;

FIG. 18 is another fragmentary perspective view of an encompassing fan unit;

FIG. 19 is a schematic cross-sectional view of the encompassing fan unit;

DETAILED DESCRIPTION

Figure 1:
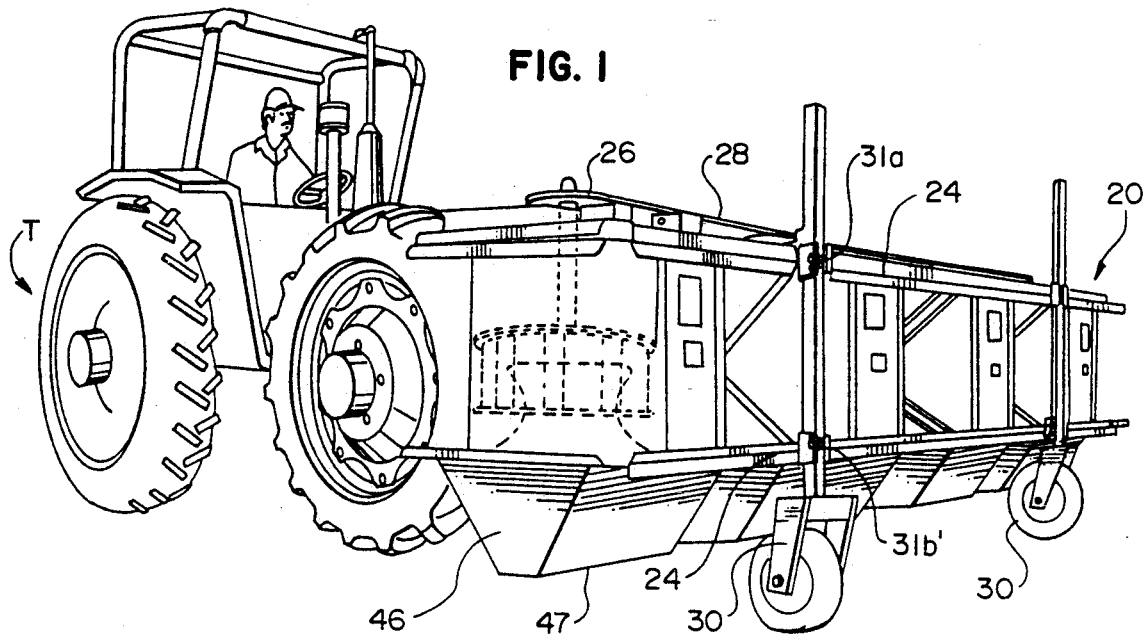
FIG. 1 is a perspective view of a four row implement employing teachings of this invention.

Referring to the drawings, FIGS. 1 through 6 depict a four row embodiment (20) of a field machine employing teachings of the invention for use in collecting and destroying insects from plants, and details of an exemplary fan unit (22). This embodiment contains many features that are included in the other embodiments. This embodiment, and the others as well, is designed so as to permit the powering of the device via conventional tractor power takeoffs through the use of belt drives, shaft drives, or hydraulic motors. This embodiment, as well as the others, also positions or dedicates at least one axial centrifugal fan unit for each crop row unit. As used herein, "crop row" shall be understood to mean an aligned series of discrete plants or plant clumps, such as individual plants or "hills" of plants, and "crop row unit" shall include not only a "crop row" but also any multiplicity of plants in a delineated narrow band which is treated as a single row for various husbandry purposes. For example, tomatoes are sometimes planted in double plant rows closely adjacent one another on a single ridge. Such an arrangement is considered to be a single crop row unit.

FIG. 1 shows an implement which is generally a plurality of fan units (22) mounted on a rigid frame (24). The frame is appropriately supported on a tractor (T) by attachment to a front-mounted three-point hydraulic hitch system (not shown). Each of the fan units is an axial flow centrifugal fan with its axis oriented vertically and having an axially aligned direct intake extending downward to a shaped restricted inlet opening (47). This inlet normally is to be disposed immediately adjacent the foilage of the plants in the crop row when the machine is in operation for collecting and destroying insects from the crop.

Each fan unit is powered by a drive pulley (26) and V-belt (28). This pulley (26) and belt (28) arrangement is an efficient and uncomplicated preferred means for supplying power to each individual unit. However, it is possible to use other means of transmitting power to each fan unit; such means include the use of gear boxes with drive shafts between each fan unit or individual hydraulic motors for each fan unit.

The embodiment (20) is supported by a tractor mounting and a pair of adjustable wheel assemblies (30). The vertical adjustability of the wheel supports 30 may be by any known means, including a vertical series of holes for selectively receiving attachment bolts as at 31a and 31b, or by clamps, jackscrews or hydraulic cylinders, as desired. The adjusting capability of the tractor mount and the wheel assemblies (30) permit height adjustment of the implement and particularly the fan intakes for crop type and size so as to maximize removal efficiency.

Figure 2:
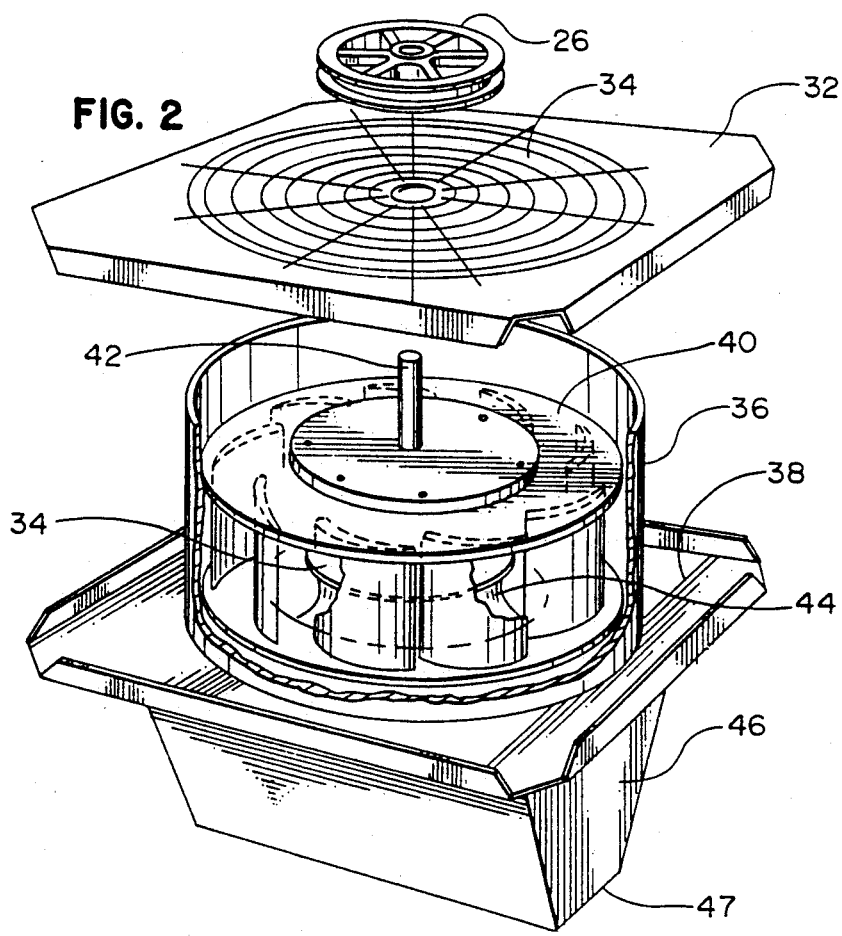
FIG. 2 is an enlarged, partially cut away view of a fan unit of the implement of FIG. 1.

FIGS. 2 and 6 depict the major components of each individual fan unit (22). The exterior or housing portions of the fan unit (22) comprise a top plate (32), a circular housing (36), and a bottom plate (38). The top plate (32) includes a protective exhaust screen (34). The bottom plate (38) includes an axial flow velocity-enhancing venturi inlet (39).

The interior components of the fan unit (22) include the fan wheel or impeller (40) and the impeller drive shaft (42). This shaft (42) has the drive pulley (26) attached at its exterior end. In addition, a velocity-enhancing coaxial inlet venturi section (44) is formed as a part of the bottom plate (38), or it may be a separate element, to define the inlet (39). The rotational motion imparted to the centrifugal fan impeller causes high velocity intake of air axially through the inlet 39 which results in the vacuum action of the invention. The attendant exhaust is vented out of the top of the fan unit (22) through the protective exhaust screen (34). Within the fan, the initially axial inflow stream makes a rather abrupt right angular change to radial flow through the impeller blades, beneath impeller top end plate 45, then another and more abrupt right angular change between the impeller tips and wall 36 to a generally axial discharge through the upper end guard screen 34.

A coaxially aligned intake transition piece (46) having an inlet opening (47) may be attached to the distal side of the bottom plate (38). The inlet opening (47) is disposed adjacent to the plant foliage. The transition piece (46) permits a directing and focusing of the air intake. Such use of a transition piece (46) is optional.

Each fan unit generates a high velocity flow of air through and immediately adjacent the plant foliage and into and through the inner fan components. By way of example, one typical fan unit may comprise a 28" diameter housing with a fan wheel which is 19" in outer diameter, a venturi throat diameter of 11" and having a rating of about 8000 cfm at 2200 rpm, which can be readily attained with the power available from conventional tractors. With an inlet opening (47) on the order of 7" by 28", external air velocities may be in the range of 100 fps adjacent the inlet openings.

The high velocity intake air stream dislodges insects from the plant foliage and sweeps them into the fans, to their destruction as noted below. The air stream also causes considerable disturbance, agitation and fluttering motion of the foliage, which is believed to assist in dislodging the insects therefrom and thereby contributes to their collection from the plant environment into the fan unit.

Any insects present in the intake air stream are destroyed when they pass through the axial flow centrifugal fan. Such fans are uncomplicated and reliable and serve to facilitate insect destruction. At present it is believed that insect destruction is primarily by forceful impingement of the insects upon the fan components and most predominately by being thrown against the outer housing (36) as a result of the abrupt angular change in flow direction from radial to axial in this area. Such impingement is a result of the two ninety degree turns the air makes as the flow first passes through the fan blades and then as it is directed to the top exhaust screen (34), see also FIG. 4.

Figure 3:
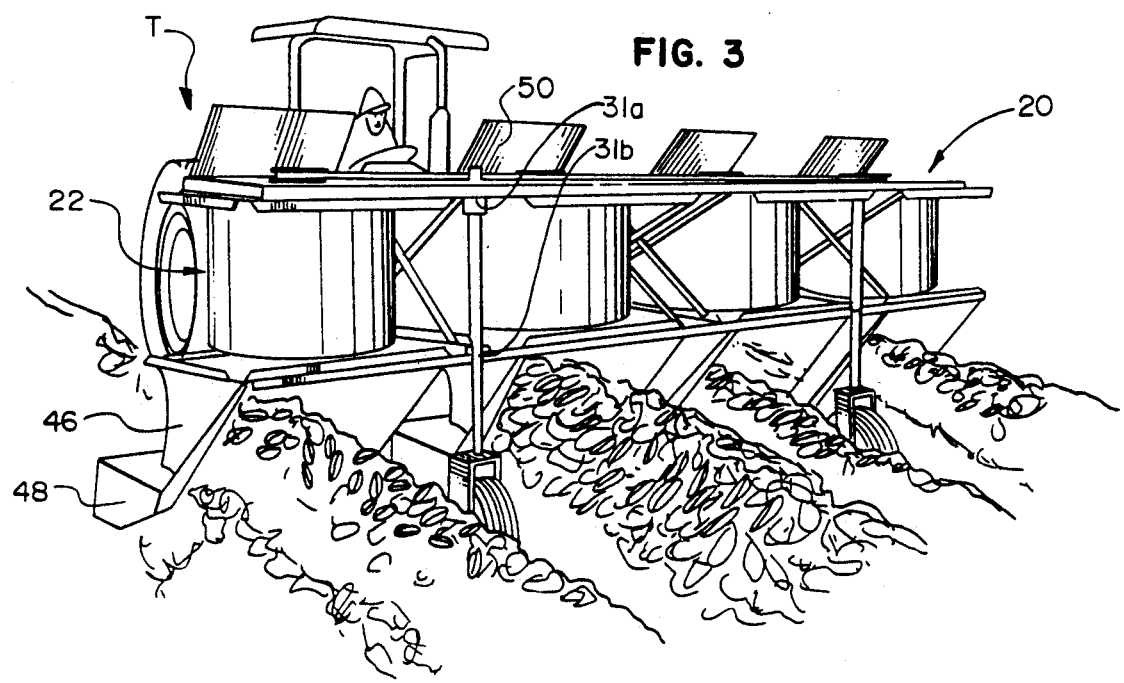
FIG. 3 is a front perspective view of such a four row implement in a working environment.

FIGS. 3 and 5 depict the four row embodiment in a crop environment. As shown in FIG. 3, shrouds (48) extend over the sides and adjacent areas of the plants and thereby create a partially confined collection chamber adjacent the fan intake. Such shrouds can maximize both crop foliage exposure to the vacuum action of the fan unit (22) and capture of the insects. Such shrouds may be used to separate, lift and guide the foliage in each crop row unit to avoid crop damage and to maximize exposure of the foliage and the immediate environs to the vacuuming action of the fan units. In addition, such shrouds may be used to confine the air inflow, further agitate the foliage and/or assist in preventing escape of insects as they are disturbed from the plants. Such disturbance is a result of either the general disruptions caused by the passage of the implement or the peripheral lower velocity air flow patterns relatively remote from the inlet opening. This shroud (48) may be attached to the distal end of the transition piece (46) or directly to the fan housing or the frame.

Shields (50) can also be attached to the top plate (32) of the fan unit (22) in order to protect the operator from the insect debris and other debris that may be entrained in the exhaust of the fan units.

Only the intake transition piece (46) is present in the area adjacent to the crop row in FIG. 5. Note that this implement utilizes a hydraulic motor (52) driven by a hydraulic power unit in the tractor in order to transmit power from the tractor engine to the implement. The motor (52) is attached to the fan wheel shaft (42) of one of the interior fan units (22). Rotational drive motion is imparted to the remaining fan units via a flexible V-belt and pulley drive system (26,28). The drive pulleys in FIG. 5 are obscured in part by the pulley and belt guards (54). The drive to the pulley (26) on each fan drive shaft (42) is taken from an output pulley (not shown) on the next inboard drive shaft (42).

Figure 4:
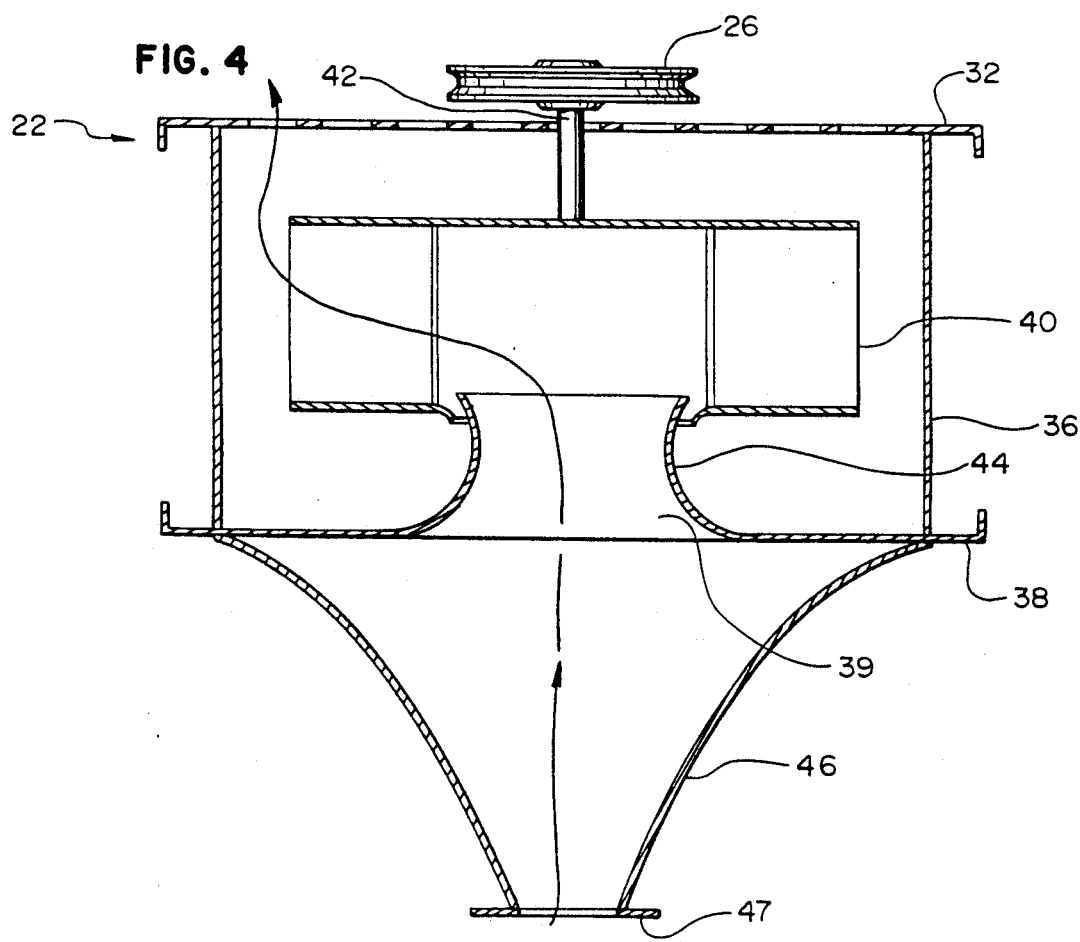
FIG. 4 is a schematic cross-sectional view of a typical fan unit.

Turning to FIGS. 4 and 6, therein are depicted cross-sectional views of fan units (22). Air is taken in through the intake transition piece (46), which results in the vacuum-action as noted above. The transition piece (46) can be formed with arcuate (FIG. 4) or straight (FIG. 6) converging side panels.

The air flow then passes through the velocity-enhancing venturi (44) and thereafter passes through the impeller, which is an axial flow centrifugal fan. Although the axial flow centrifugal fan is advantageous in these implements and is the preferred means of creating the airflow and insect destruction, the invention in its broader aspects should not be considered to be limited to this type of fan. Finally, the air exits the fan unit through the protective exhaust screen (34). All or virtually all insects captured in the intake air stream are destroyed as they pass through the fan.

Figure 7:
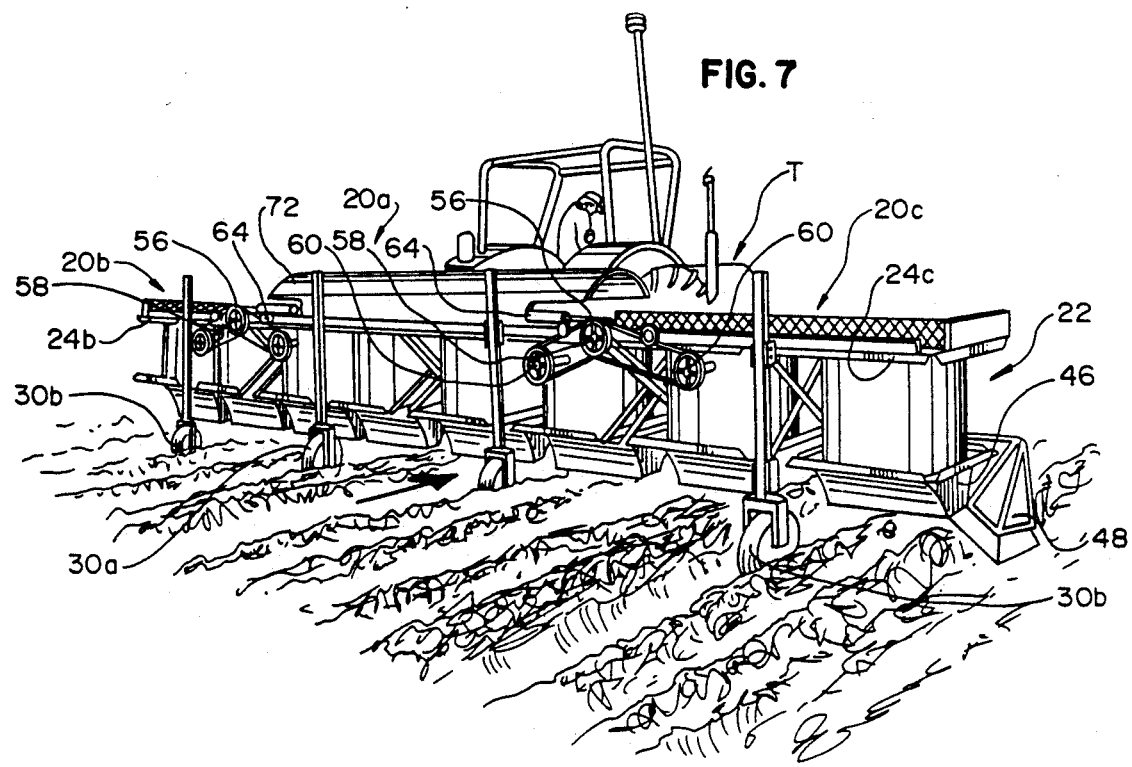
FIG. 7 is a perspective view of an eight row implement employing further teachings of the invention in a working environment with the outer fan units in a lowered position.
Figure 8:
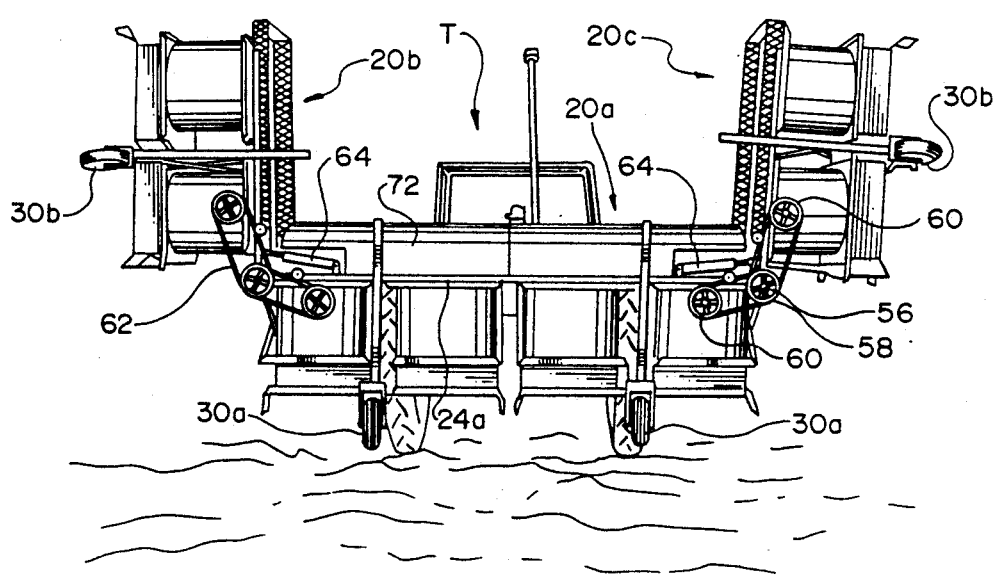
FIG. 8 is an elevation view of the eight row implement with the outer fan units in a raised position.
Figure 9:
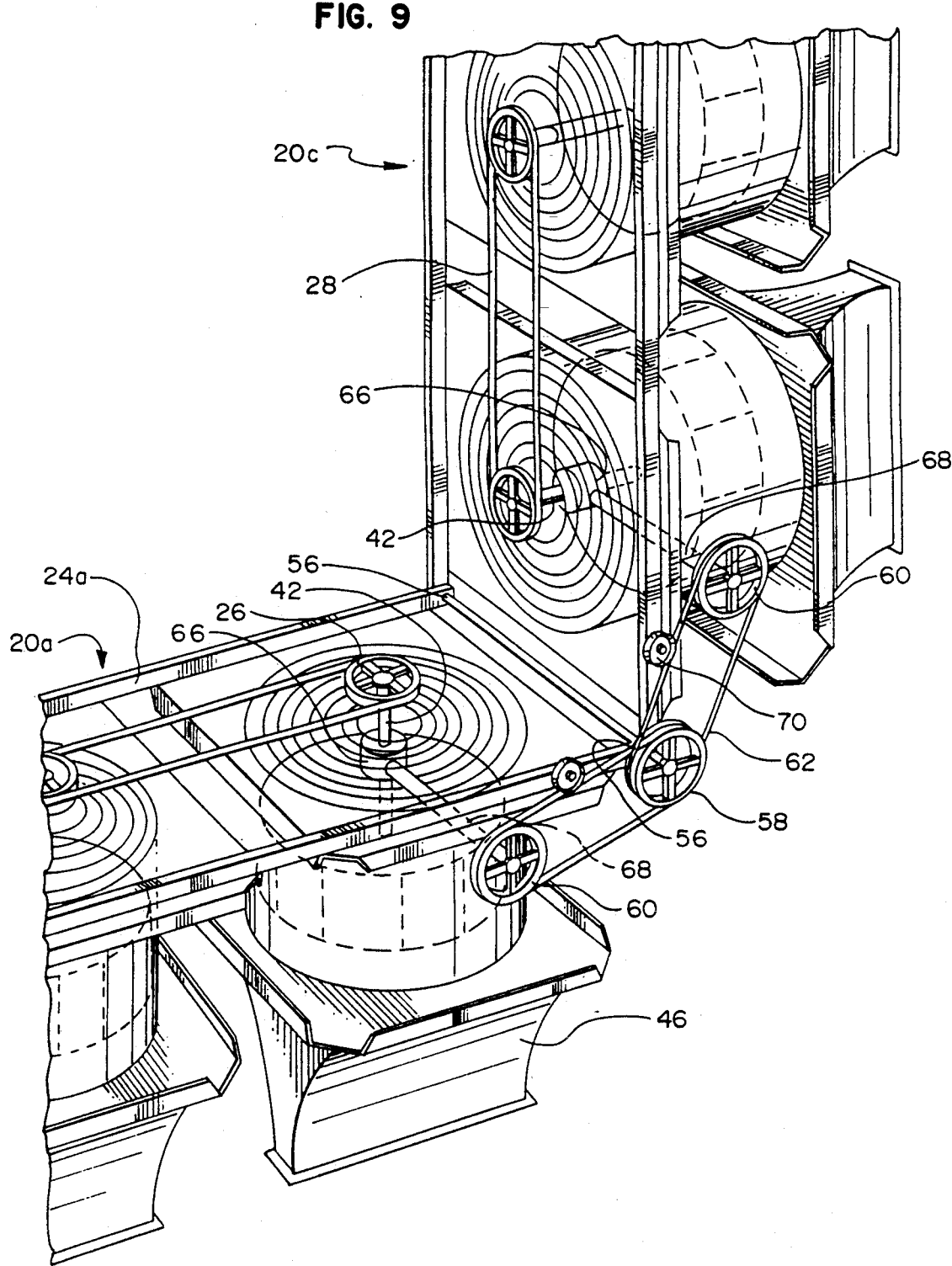
FIG. 9 is an enlarged perspective view of the articulated interconnection when the outer units are in a raised position.

FIGS. 7, 8 and 9 depict an eight row embodiment in the lowered and raised positions respectively and illustrate the articulated system features of this invention. This eight row embodiment is articulated at two points so as to permit a folding of the two exterior end units at each end of the implement. This capability facilitates navigation of the tractor-implement combination, such as during turning maneuvers at each end of a field, transportation of the implement between work sites, and storage of the implement. The implement can be used with the transition piece (46) alone or in combination with the foliage guide shroud (48), as desired.

The eight row implement comprises a four fan unit interior section (20a) which may be on a single rigid frame (24a), and a pair of two fan unit end sections (20b, 20c). Each end section (20b, 20c) includes a frame portion (24b, 24c) and is attached to the left or right end of the frame (24a) of interior section (20a) via a horizontal fore-and-aft axis pivot hinge arrangement (56). The basic mode of operation of each individual fan unit is identical in the eight-row and four-row machines.

The interior section is supported by a pair of adjustable support wheel assemblies (30a) corresponding to the assemblies 30 described above. FIG. 7 shows that each end section is also supported by a similar adjustable wheel assembly (30b) when the section is in a lowered position.

An articulated drive system is included in this embodiment so as to permit continuous fan unit operation while the end sections are adjusted to and maintained in the raised, lowered, and various intermediate positions. This drive system comprises dual junction pulleys (58), which are fixed to rotate together, disposed with their axis of rotation coaxial with the pivot hinge (56). Power transfer pulleys (60) are centrally located on the two fan units immediately adjacent to each side of the hinge (56) and are positioned in relatively the same vertical plane as the respective junction pulley (58). Drive V-belts (62) connect each of these pulleys (58) with one of the transfer pulleys (60).

A pair of double acting hydraulic cylinders (64) are provided for pivoting each end section (20b, 20c) to a raised or lowered position. Such cylinders are the preferred means of effectuating section position adjustment and maintenance; however, this invention is not limited to the use of hydraulic cylinders to position the exterior sections.

FIG. 9 is a detailed depiction of the articulated frame and drive system located on one side of the implement. The construction of the opposing side is a mirror image of that illustrated here. The hydraulic cylinders are omitted in this figure for the sake of clarity.

The fan units of the interior section (20a) which are immediately adjacent to the hinge (56) transmit power to the adjacent exterior sections (20b, 20c). A gear box (66) is located on the fan shaft (42) of each of these adjacent fan units. Each gearbox (66) provides right-angle drive connection between the respective fan wheel shaft (42) and a horizontal power shaft (68). Each horizontal shaft (68) has a transfer pulley (60) affixed at its exterior end. The transfer pulley (60) on the interior fan unit thus imparts rotational drive of the junction pulley (58) via a drive belt (62), which in turn imparts via another drive belt (62) rotational drive of the transfer pulley (60) of the exterior fan unit immediately adjacent to the hinge (56) to drive the exterior units. Idler pulleys (70) maintain proper tension on both drive belts (62).

Alignment holes (71) are provided in the respective ends of the frame members remote from the pivot axis (56) to receive pins for locking the end wing sections (20b, 20c) in their extended positions if desired.

It will be appreciated that by virtue of the coaxial relation of the intermediate drive pulleys 58 with the pivot axis of the respective end unit 20b, 20c and the fixed position of each of the pulleys (60) on the respective pivoted end frame, the radial dimensions and hence the drive connection are maintained throughout the pivotal adjustment of each of the end sections. Thus, the operator need not stop the fan drive for adjusting the end sections relative to the center main frame, such as when raising the end sections during turning movements at the ends of the crop rows.

Although the eight row implement is depicted as being mounted on the rear of a tractor, it also could be front mounted. A protective covering (72) is provided over the fan units of the interior section (20a) in order to protect the operator from the exhaust air and debris. A front mounting would require shielding over all of the fan units.

Figure 10:
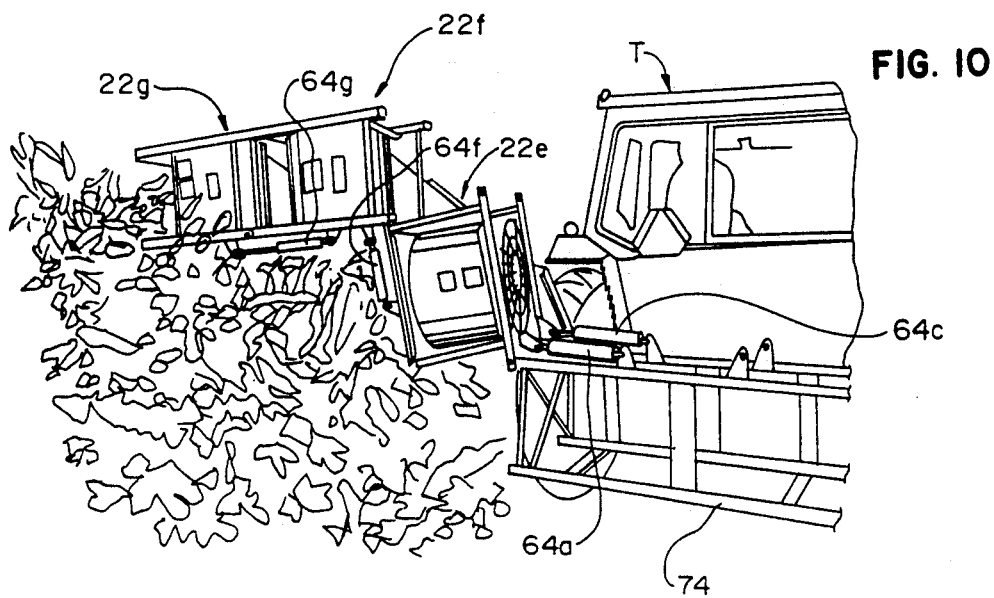
FIG. 10 is a perspective view of a multiply articulated embodiment in a working environment.
Figure 11:
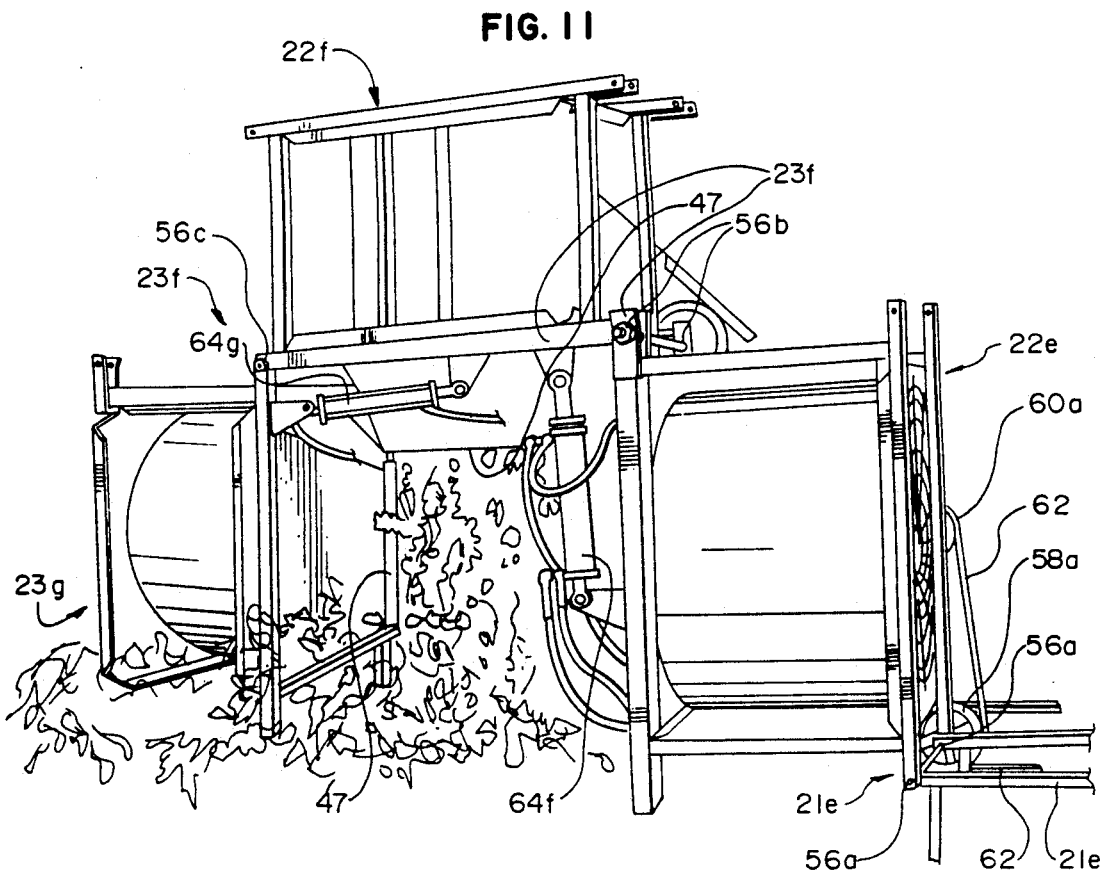
FIG. 11 is an enlarged perspective view of the multiply articulated embodiment in one working array.

FIGS. 10, 11, and 12 depict a multiply articulated embodiment. The depicted embodiment utilizes three fan units, but it is possible to use more or fewer units depending on the application. A mounting frame (74) allows the implement to be supported on the rear of the tractor, such as on the three-point hitch.

Each fan unit includes the same general transfer pulley (60), horizontal shaft (68), gear box (66), and fan wheel shaft (42) arrangement as the fan units described previously in respect to FIG. 9 except that each fan wheel shaft (42) of the pivotally movable units is driven through a gearbox (66) and hence need not have a drive pulley attached at its exterior end. The basic construction and mode of fan unit operation are otherwise identical in the multiply articulated implement as in the other described embodiments.

The fan unit (22e) located immediately adjacent to the tractor mount is pivotally attached to the mount frame adjacent the exhaust end of the fan unit, i.e., between the upper frame elements (21e). This attachment forms hinge axis (56a). The position of this fan unit, and therethrough the entire outboard implement, can be adjusted and maintained by a pair of double acting hydraulic cylinders (64e); see FIG. 10. These cylinders at hinge axis (56a) are not depicted in FIGS. 11 and 12 in order to more fully illustrate the hinge region. A dual junction pulley (58) is located coaxially with this hinge joint in order to impart, via V-belts (62) and transfer pulley (60a), drive to this first pivotable unit (22e) in the same manner as described above with respect to FIGS. 7-9.

The next outboard unit (22f) is pivotally attached to unit (22e) between the lower frame sections (23f) of the respective fan units to form hinge axis (56b). A junction pulley (58b) on the pivot shaft along this axis (56b) and further belts (62) joining transfer pulleys (60a, 60b) to pulley (58b) drive the unit (22f) through its respective power shaft and gearbox similar to the arrangement FIGS. 9-11. Double acting hydraulic cylinders (64f) are provided to adjust and maintain the pivot position of this next fan unit (22f) relative to the first fan unit (22e).

Turning to FIGS. 11 and 12, the fan unit (22f) at its other side is pivotally attached to a second outboard fan unit (22g), the point of attachment also being located adjacent the intake end of both units, e.g., at the lower frame sections (23f). This attachment forms a hinge axis (56c). A pair of double acting hydraulic cylinders (64g) are mounted between these fan units in order to facilitate position adjustment and maintenance of the outboard unit (22g) relative to unit (22f). A dual junction pulley (58c) is located at this hinge, and transfers the rotational drive from the transfer pulley (60b) of unit 22f to the transfer pulley (60c) of the second outboard fan unit (22g) to drive this latter fan unit. It will be appreciated that the transfer pulleys (60a and 60b) also are double sheaves.

The above described arrangement permits all three fan units to be belt driven from a single power takeoff. This arrangement also permits adjustment of the relative position of each of these fan units while the implement is driven and running.

FIGS. 13 through 20 depict an embodiment which uses encompassing fan units (80) with each unit (80) to receive one such double row crop row unit. These encompassing fan units (80) redirect a portion of the exhaust air back down to the primary foliage zone in order to assist in the dislodgement of insects and thereby facilitate insect removal, collection and destruction.

A plurality of encompassing fan units (80) are attached to an outrigger frame (82) support by frame (83). This outrigger frame is supported by an adjustable wheel arrangement (84) and a tractor mount frame (86) shown supported on a typical 3-point agricultural tractor hitch system (87). The outrigger (82) is pivotally attached to the mount frame (86); thus allowing the outrigger to be transported lengthwise as a trailing unit behind the tractor rather than in an extended outrigger position. When the implement is to be operated, the implement is swung out to its outrigged position, with its axis perpendicular to the longitudinal movement axis of the tractor. The unit can be held in this position by a locking mechanism between the outrigger frame and the mount frame and by a tension chain or cable attached to and extending from an outer portion of the implement, e.g., adjacent the upper end of support 84, to the front portion of the tractor.

This arrangement provides for treatment of crops on only one side of the tractor. However, it is contemplated that a similar outrigger can extend from each side of the tractor so as to permit simultaneous treatment of crop rows on both sides of the tractor.

The tractor mount (86) includes a drive assembly (88), which comprises appropriate drive shafts and a gear box. The drive assembly (88) imparts rotational motion to a main drive pulley (90), which in turn imparts rotational motion to the unit drive pulleys (92) by appropriate interconnecting belts (91, 93). The intermediate pulleys (92a) are double sheave pulleys for power reception and transmission purposes.

FIGS. 17-19 further depict the lower portions of the encompassing fan unit. Blast ducts (94), which serve as air channeling means, are positioned at the left and right sides of each encompassing fan unit. These blast ducts are bolted to the fan unit housing in order to facilitate removal and attachment. For example, the inner walls (95) may have an upper lip (95a) which engages a slot formed by a bracket (95b) affixed to the fan housing wall (38) and flanges (95c) on the outer walls secured to flanges (95d) on the fan housing (36c) by bolts (95e). The ducts can be constructed in a variety of sizes and heights thus allowing the fan units to be readily adaptable for various crops at all stages of crop growth.

Figure 20:
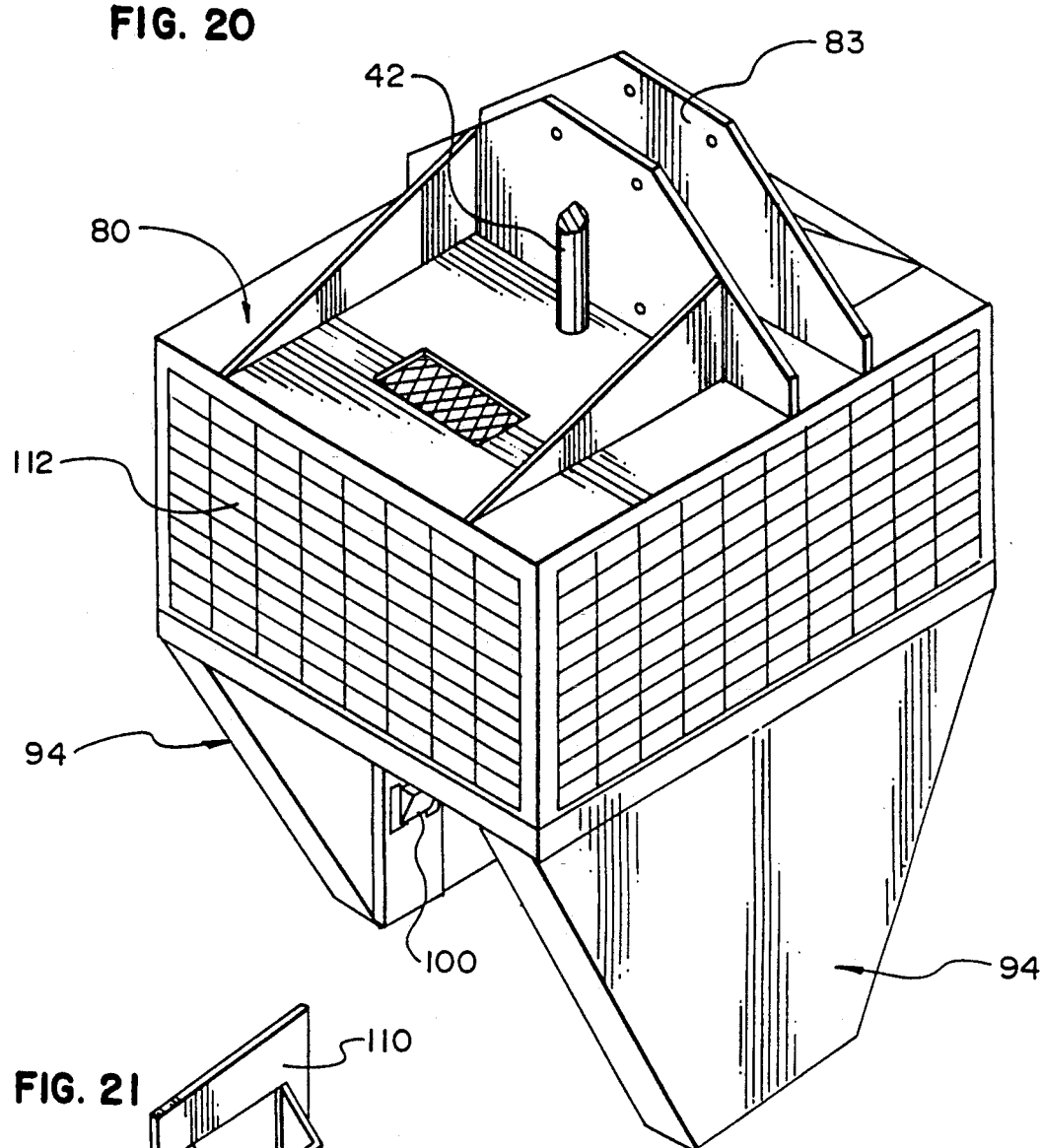
FIG. 20 is a top perspective view of an encompassing fan unit.

The blast ducts (94) communicate with radially outward portions of each fan housing, being attached at the intake end of each fan housing and extend from that attachment point downward to and along and adjacent lateral side of the foliage zone of the crop row unit. Each of the ducts (94) may be of rectangular configuration in side view, as in FIG. 18 or tapered toward the bottom, as illustrated in FIG. 20. A pair of diverging plaint foliage guides (96), which are "L" shaped panels, are pivotally attached via hinges (97) along vertical axes near the central region of each blast duct (94). These guides, which are optional, serve to direct the crops foliage into the central removal zone of each encompassing fan unit. The positioning of each plant guide (96) can be adjusted via support arms (98) which are adjustable in length e.g., the illustrated turnbuckles or by any other suitable support element.

Turning specifically to FIGS. 18 and 19, the positioning of the blast duct (94), plant guides (96), and hinges (97) is evident. Along the center axis of the inside surface of each blast duct (94) therein is located a plurality of exhaust ports. These ports permit exhaust air flow generated by the fan to be channelled back towards the plant. Air scoops (100) focus and direct the resulting air blasts upwardly towards the upper portions of the plants. A lower end air scoop (102) can also be added at each side as in FIG. 19 to extend laterally toward or even beneath the plant foliage. These air blasts enhance the dislodgement and collection of insects; thereby facilitating their removal and destruction.

Figure 21:
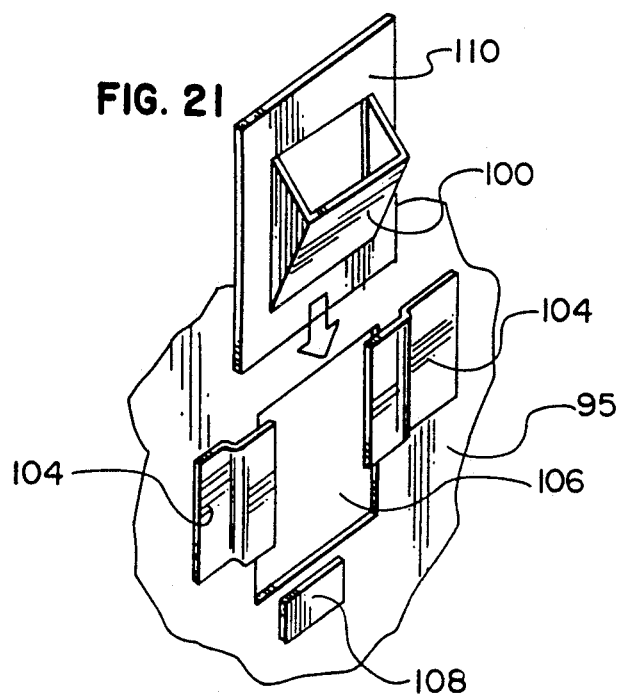
FIG. 21 is a partial perspective view of a blast guide plate mounting in the embodiment of FIG. 13.

The air blast guides (100) can be bolted to the blast duct (94) or slidingly engage in edge guides along an opening or openings through the inner wall (95). For example, referring to FIG. 21, slideway guides (104) are attached along each side of an opening (106) through the wall (95), with a stop member (108) therebelow, to receive and position a plate member (110) which includes an opening therein and carries the guide (100). A flat closure plate may be substituted for the guide plate member (110) when supplemental air blast through one of the openings is not to be used. Guides plates with different sized openings and variously shaped guides may be substituted. Somewhat similarly, a single elongated opening may be provided over the height of each wall (95) with guides (104) of similar length to receive and retain a series of outlet air blast guides and blocking plates in accordance with the location and relative quantity of the openings desired for supplemental air blasts. If an air blast is not desired, the air scoop can be removed and a closure plate substituted therefor, as noted.

FIG. 19 also depicts the many similarities the encompassing fan unit embodiment has with the other embodiments. Each encompassing fan unit includes an axial centrifugal fan as the fan wheel (40) and a velocity-enhancing venturi (44). The axial centrifugal fan (40) intakes air through the venturi (44) and the axial flow intake area (99) to draw the insects from the plant and its environs. This air passes through the fan, where the insects collected in the air stream are destroyed. A portion of this exhaust air is then allowed to escape the fan unit through the screened or louvered side vents (112) or the screened inspection port (114). The louvers on the side walls insure impact of the stream and insects on the louvers and sides as the stream exits. This exhaust portion also may be controlled by control of the effective areas of these exhaust openings. The remainder of the exhaust air enters the ducts (94), where this air is directed back against the plants. The exhaust air exiting the ducts serves to dislodge insects from the plants; thereby facilitating insect removal and destruction.

The blast ducts can be constructed in alternative arrangements. Such arrangements include the use of side slots with other types of shutters to control the effective amount and/or position of the recirculation blast openings.

It will be appreciated that improved systems have been provided for the removal and destruction of insects from living crops, which meet the aforestated objects. Fan units dedicated to each crop row unit maximize insect removal and destruction. The direct inlet axial centrifugal fans are efficient in collecting and removing the insects and in destroying them. The support frames for the implement can be articulated and driven in such a manner so as to permit adjustment of fan unit positions while the fan units are driven and running. This articulation facilitates implement adaptability, maneuverability, transportation, and storage. The fan units can also be constructed in an encompassing design, which directs part of the exhaust back to the plant in the form of a continuous air blast. This air blast assists in the removal of insects through dislodgement.

The foregoing has concentrated on the preferred embodiments of the claimed invention. However, it is to be understood that changes in the construction, combination and arrangement of parts may be resorted to without departing from the spirit and scope of the invention as claimed.

We claim:

1. An implement which in operation removes and destroys insects or the like from plants arrayed in multiple parallel crop row units, comprising:

frame means for spanning a plurality of such crop row units and supporting a plurality of fan units;

a plurality of high velocity airflow fan units each of which includes an impeller and a housing surrounding said impeller and which defines an intake section which is open and extends in substantially coaxial alignment with said impeller throughout its length from said impeller to an open inlet end, said housing including outlet means which cause air discharged from said surrounding housing by said impeller to change direction as it exits from said housing, whereby each such fan unit in normal operation removes insects and the like from such crop row units and the adjacent environment and destroys substantially all such insets or the like passing through said fan unit by subjecting them to destructive physical forces in the course of such passage;

at least one of said fan units mounted on said frame means for each of said plurality of crop row units to be spanned by said frame means, and each said fan unit positioned to have said open inlet end thereof adjacent to the respective crop row unit, thereby permitting insects or the like to be removed and destroyed from a plurality of crop row units simultaneously and the resulting debris to be freely discharged back into the environment.

2. An implement as in claim 1 wherein each said fan unit comprises an axial flow venturi inlet.

3. An implement as in claim 1 or 2 wherein each of said fan units comprises an axial flow centrifugal fan having a direct inlet oriented along the axis of rotation of said fan and each fan is oriented such that said axis thereof will be transverse to the respective crop row unit.

4. An implement as in claim 3 wherein said axes of rotation are oriented vertically.

5. An implement as in claim 3 wherein each of said fans is positioned on said frame means with the axis of rotation thereof disposed perpendicular to the lateral extension of said frame.

6. An implement as in claim 5 wherein at least one of said fan units is positioned adjacent to each of said plurality of plant row units spanned by said frame means.

7. An implement as in claim 6 wherein each of said fan units is position on said frame in equidistant spaced relation to one another.

8. An implement as in claim 1 including means for gathering and guiding plant foliage adjacent said open inlet end of each of said fan units.

9. An implement as in claim 1 wherein each said intake section includes a transition piece between said open inlet end and said impeller.

10. An implement as in claim 1 wherein each of said fan units is of a design to draw insects and the like thereinto by high velocity airflow from the vicinity of the respective crop row unit and to cause abrupt change of direction of such flow by impingement at high velocity against solid surfaces in the course of passage to the exhaust therefrom for destruction of such insects and the like.

11. An implement as in claim 10 wherein each of said fan units is an axial flow centrifugal fan.

12. An implement as in claim 11 wherein each of said fan units includes an axial exhaust discharge.

13. An implement as in claim 11 wherein each of said fan units includes peripheral discharge through flow diverting means for effecting such abrupt change of direction of air flow.

14. An implement for removing insects and the like from plants arrayed in multiple parallel crop row units, comprising:
an articulated mounting frame for spanning a plurality of crop row units and including a first frame portion and a second frame portion which is movable about an axis of articulation to various positions relative to said first frame portion;
a plurality of fan units each having an impeller and a housing having an intake, at least one of said fan units being mounted on each of said frame portions; and
a mechanical drive for operating said fan units, said mechanical drive including a rotary drive element coaxial with said axis of articulation and drive-connected to said fan unit on said second movable frame portion, thereby permitting repositioning of at least said second frame portion and said fan unit thereon relative to said first frame portion and said fan unit thereon while said fan unit is in operation.

15. An implement as in claim 14 wherein each of said fan units is an axial flow centrifugal fan having an axially aligned inlet with an open distal inlet end, each of said fan units being disposed on the respective frame portion such that said inlet opening is positioned adjacent to the respective crop row unit in normal operation.

16. An implement as in claim 14 wherein said implement comprises an articulated drive means, including said rotary drive element, for providing continuous operation of said fan units throughout various positions of adjustment of said second frame portion relative to said first frame portion.

17. An implement as in claim 16 wherein said articulated frame is manipulated via adjustment means.

18. An implement as in claim 14 or 16 further comprising at least one fan unit dedicated per crop row unit.

19. An implement for removing insects or the like from plants arrayed in multiple parallel crop row units, comprising:
frame means for spanning a plurality of such crop row units and supporting a plurality of fan units;
at least one fan unit mounted on said frame means for each such crop row unit to be spanned by said frame means, wherein each of said fan units is an axial flow centrifugal fan including an impeller and a housing having a direct inlet oriented along the axis of rotation of said impeller and forming an open linear air flow path from an inlet opening thereof into said impeller along said axis, said fan disposed with said inlet opening positioned to be adjacent to the respective crop row unit, and each fan unit oriented such that said axis thereof will be transverse to the respective crop row unit, whereby insects or the like in the vicinity of such crop row units are drawn directly and generally axially into the respective fans with the intake flow of air and are subjected to a change of direction of said flow at high velocity by impingement at such high velocity against a solid surface therein for their destruction.

20. An implement as in claim 16 wherein said drive means includes a drive input to each of said fan units, each said drive input being located at a fixed radial distance from the articulation axis of the respective frame portion.

21. An implement as in claim 20 which includes multiple articulated frame portions that are pivotally movable relative to other frame portions and each having one of said fan units thereon, wherein said drive means include a rotary element disposed in a coaxial arrangement with each respective axis of articulation.

22. An implement as in claim 21 wherein said drive means further comprises flexible drive transmissions interconnecting said rotary elements and said drive inputs to the respective fan units.

23. An implement as in claim 22 wherein said flexible drive transmission includes pulleys and belts.

24. An implement as in claim 22 wherein said flexible drive transmission includes sprockets and chains.

25. An implement for removing insects or the like from plants arrayed in multiple parallel crop row units, comprising:
frame means for mounting a plurality of encompassing fan units;
a plurality of encompassing fan units, wherein each of said fan units includes an impeller and a housing therefor with a direct air intake for drawing air and insects or the like from plants and the adjacent environment into said fan unit, each of said fan units disposed on said frame means with said housing and impeller positioned to be immediately adjacent to the respective crop row unit, with said intake thereof disposed entirely between said impeller and said respective adjacent corp row unit and communicating directly from said impeller to said adjacent crop row unit, and exhaust guide means for directing at least a portion of the exhaust air from said fan units against at least a portion of a plant which is adjacent each said intake.

26. An implement as in claim 25 wherein each of said fan units is an axial flow centrifugal fan.

27. An implement as in claim 25 wherein each said encompassing fan unit is mounted on said frame with said air intake positioned to be superjacent such a crop row unit and said exhaust guide means extends downward therefrom and is positioned to direct such exhaust air against a portion of such crop row unit below said air intake.

28. An implement as in claim 27 wherein each said encompassing fan unit includes two such exhaust guide means spaced from one another to receive such a crop row unit therebetween and to direct such exhaust air against opposite side portions of such a crop row unit therebetween.

29. An implement as in claim 25 wherein said exhaust guide means comprises at least one air channeling means.

30. An implement as in claim 29 further comprising at least one encompassing fan unit for each crop row unit to be spanned by said frame means.

31. An implement as in claim 29 further comprising:
at least one plant guide, said plant guide further comprising a panel pivotally-attached to said air channeling means and an adjustment means for adjusting said panel.

32. An implement as in claim 29 wherein said air channeling means further comprises a blast duct and at least one exhaust port subjacent to each said fan unit.

33. An implement as in claim 32 wherein said air channeling means is disposed on the underside of each said fan housing.

34. An implement as in claim 33 wherein said air channeling means is removably attached to the respective said fan housing by channel attachment means for permitting a variety of said air channeling means to be attached to said fan housing.

35. An implement as in claim 34 wherein said channel attachment means include bolts or screws.

36. An implement as in claim 34 wherein said channel attachment means include brackets.

37. An implement for removing insects or the like from plants arrayed in multiple parallel crop row units, comprising:
a frame means for mounting a fan unit;
at least one fan unit mounted on said frame means and including an impeller and a housing which defines a direct air intake for drawing air and insects or the like from such plants and from the environment adjacent such plants into said fan unit, said fan unit disposed on said frame means with said housing and impeller positioned to be immediately adjacent to the respective crop row unit and with said intake thereof disposed entirely between said impeller and said respective adjacent crop row unit and communicating directly from said impeller to said adjacent crop row unit, and an exhaust air redirecting means for directing at least a portion of the exhaust air from said fan unit against at least a portion of a plant which is adjacent said intake and in a direction towards said air intake.

38. An implement as in claim 1, 14, 12 and 37 wherein each of said fan units develops sufficient air volumes at air velocities of about 100 fps adjacent the intake of the fan unit to remove the insects from the plants and thereafter destroy the insects by forceful impingement with portions of the respective fan unit.

39. An implement as in claim 38 wherein aech of said fan units moves about 8000 cfm of air when driven at 2200 rpm.

40. An implement which in operation removes and destroys insects or the like from plants arrayed in multiple parallel crop row units, comprising:
an articulated mounting frame for spanning as plurality of crop row units and including a first frame portion and a second frame portion which is movable to various positions relative to said first frame portion; and
a plurality of high velocity air flow fan units each of which includes an impeller and a housing surrounding said impeller and which defines an intake section extending substantially coaxially from said impeller to an open inlet end, said housing including outlet means which cause air discharged from said surrounding housing by said impeller to change direction as it exits from said housing, whereby each such fan unit in normal operation removes insects or the like from such crop row units and the adjacent environment and destroys substantially all such insects or the like passing through said fan unit by subjecting them to destructive forces in the course of such passage through said impeller and housing, at least one of said fan units being mounted on each of said frame portions, thereby permitting insects or the like to be removed and destroyed from a plurality of crop row units simultaneously and the resulting debris to be freely discharged back into the environment.

41. An implement for removing and destroying insects or the like from plants arrayed in multiple parallel crop row units, comprising:
frame means for spanning a plurality of such crop row units and supporting a plurality of fan units;
a plurality of axial flow centrifugal fan units each of which includes an impeller and a housing therefor and which in normal operation removes insects or the like from such crop row units and the adjacent environment and destroys substantially all such insects or the like passing through said fan unit by subjecting them to destructive physical forces in the course of such passage;
at least one of said fan units mounted on said frame means for each of said plurality of crop row units to be spanned by said frame means, and each fan unit positioned to have its inlet opening adjacent to the respective crop row unit, each of said fan units being of a design to draw insects or the like thereinto by high velocity air flow from the vicinity of the respective crop row unit and to cause abrupt change of direction of such flow by impingement at high velocity against solid surfaces in the course of passage to the exhaust therefrom for destruction of such insects or the like, wherein each of said fan units includes peripheral discharge through flow diverting means which comprises louvers in the periphery of said fan units for effecting such abrupt change of direction of air flow, thereby permitting insects or the like to be removed and destroyed from a plurality of crop row units simultaneously and the resulting debris to be freely discharged back into the environment.

* * * * *

UNITED STATES PATENT AND TRADEMARK OFFICE
CERTIFICATE OF CORRECTION

PATENT NO.   : 5,255,469
DATED        : October 26, 1993
INVENTOR(S)  : Eugene G. Sukup, et al It is certified that error appears in the above-indentified patent and that said Letters Patent is hereby corrected as shown below:

On the Title Page, Item [56], under OTHER PUBLICATIONS,
line 6, insert quotation marks around "Beguiling Bag Vacs".

Under OTHER PUBLICATIONS, line 8, delete the "." after "B".

Column 3, line 3, "unity" should read --unit--.
Column 10, line 56, "insets" should read --insects--.
Column 11, line 19, "position" should read --positioned--.
Column 11, line 44, "and" should read --or--.
Column 13, line 2, "corp" should read --crop--.
Column 14, line 5, "aech" should read --each--.

Signed and Sealed this

Nineteenth Day of April, 1994

*Attest:*

BRUCE LEHMAN

*Attesting Officer*   Commissioner of Patents and Trademarks